(12) United States Patent
Fahey

(10) Patent No.: US 6,200,473 B1
(45) Date of Patent: Mar. 13, 2001

(54) IN-TRANSIT WATER TREATMENT SYSTEM

(76) Inventor: G. Scott Fahey, 2787 Stoney Fork, Boise, ID (US) 83706

( * ) Notice: Subject to any disclaimer, the term of this patent is extended or adjusted under 35 U.S.C. 154(b) by 0 days.

(21) Appl. No.: 09/187,476

(22) Filed: Nov. 6, 1998

(51) Int. Cl.$^7$ ................................ C02F 1/78; B01F 13/02
(52) U.S. Cl. ........................ 210/205; 210/241; 137/899
(58) Field of Search ..................... 210/198.1, 205, 210/241, 244, 249, 167, 192, 194, 760, 758; 137/899; 280/838

(56) References Cited

U.S. PATENT DOCUMENTS

| | | | |
|---|---|---|---|
| 4,046,689 | * 9/1977 | Argyll | 210/241 |
| 4,906,358 | 3/1990 | Sasaki et al. | 210/167 |
| 4,959,142 | 9/1990 | Dempo | 210/167 |
| 4,963,269 | 10/1990 | Sasaki et al. | 210/760 |
| 4,990,249 | * 2/1991 | Leuenberger | 210/167 |
| 5,009,511 | * 4/1991 | Sarko et al. | 210/673 |
| 5,055,204 | * 10/1991 | Bogart | 210/758 |
| 5,427,693 | * 6/1995 | Mausgrover | 210/760 |
| 5,679,257 | * 10/1997 | Coate et al. | 210/695 |
| 6,090,281 | * 7/2000 | Buckner | 210/205 |

* cited by examiner

Primary Examiner—David A. Simmons
Assistant Examiner—Frank M. Lawrence
(74) Attorney, Agent, or Firm—Craig M. Korfanta

(57) ABSTRACT

A combination of a water tanker and a water treatment system containing an oyxgen generator, an ozone generator and a tank mixing eductor for in-transit treatment of water. At least the ozone generator is supported by an air suspension system which is specifically designed to eliminate vibration which may otherwise damage the ozone generator. A pump re-circulates water from the tank, through an ozone injector and back in to the tank through the mixing eductor. The invention provides at least two distinct operating modes which include complete water sterilization using ozone and simple water oxygenation followed by tank sterilization after livestock transport.

36 Claims, 4 Drawing Sheets

IN-TRANSIT WATER TREATMENT SYSTEM

BACKGROUND OF THE INVENTION

1. Technical Field

This invention generally relates to water treatment apparatus. More particularly, this invention relates to a portable water treatment apparatus for use in the transport of drinking water and aqua culture product transport.

2. Background

Recently, the bottled water market has experienced a surge in sales. This may be due to both a more limited availability of potable water and a desire among consumers to drink water which has not been treated with chemicals such as chlorine and fluoride. Besides the bottled water market, it is also often necessary to deliver potable water to a remote location when it is not otherwise available. Regardless of the reasons, the transport of fresh water from its source to a bottling plant or storage facility is necessary.

In addition to the transport need, regulatory agencies require that fresh water be treated to remove organic contaminants. To date, this has required a water treatment plant to be installed either at the water source or at the bottling plant, usually at the bottling plant because of cost concerns. The water treatment plants have traditionally used sanitation processes such as chemical treatments and ultraviolet irradiation to sanitize the water. More recently, ozonation of water has been implemented in treatment plants which results in the complete sterilization of the water leaving only residual ozone, carbon and non-organics in the water as opposed to sanitation which reduces microbial activity down to trace levels. Bottlers and packagers of water regularly require sanitation of the tanker trucks to reduce contamination build-up and cross-contamination risks, realizing that sterilization has heretofore been impracticable.

One of the most effective methods for treatment of water involves the controlled mixing of ozone into the water. An excellent explanation of this treatment process appears in the November 1988 issue of UltraPure Water® entitled Microbial Control-Ozone, The Process Water Sterilant. Several United States patents deal with treating water with ozone. Examples of these patents include U.S. Pat. Nos. 4,959,142, 4,963,269 and 4,906,358. In particular, U.S. Pat. No. 4,959, 142 discloses a water treating apparatus having a circulating type water pipe for removing the water from the tank, treating the water with ozone, filtering the water, and he treating the water with ultraviolet radiation and subsequently returning the water to the tank.

At least one attempt has been made to install a portable ozonator on a water tanker to treat the water while the water is in transit, however, this attempt was unsuccessful. The problem stems from the limited availability of power and resources on a vehicle. FIG. 1 labeled PRIOR ART illustrates the apparatus of the prior attempt. The prior attempt used bottled oxygen O2 in combination with a portable generator G powered ozone generator O3 bubbled trough a baffle tube T in the tank to treat the water in transit. It was found that the system was incapable of generating any residual ozone within the treated water as is required by the bottler, which meant that the water had to be re-treated at the plant. Prior to the present invention, it was thought to be impracticable, if not impossible, to provide in transit ozonation of water as the relatively short transit times required too much power to support the high rate of ozonation required to treat the quantity of water within the limited amount of time.

When transporting aqua culture livestock it is necessary to oxygenate the water in the tanker in order to insure the viability of livestock. Additionally, after transporting a load of aqua culture livestock, it is necessary to sanitize the tanker to prevent cross contamination should a load of livestock contained diseased stock or an element which may be incompatible with a different load of livestock. Heretofore, this has required the truck operator to chemically treat the tank between loads by adding chemical agents to relatively clean water introduced into the tank after the load of livestock has been unloaded. Unfortunately, this only results in the tank being sanitized and not sterilized.

What is needed is a water tanker which is capable of treating water for drinking purposes during transit to eliminate the need for pre-treatment or post treatment. Additionally what is needed is a water tanker capable of aqua culture livestock transport which can oxygenate the water in the tanker during transport and sterilize the tank after the livestock has been unloaded.

SUMMARY OF THE INVENTION

The invention solves foregoing needs as well as providing other advantages by the combination of a water tanker and a water treatment system containing an oyxgen generator, an ozone generator and a tank mixing eductor. At least the ozone generator is supported by an air suspension system which is specifically designed to eliminate vibration which may otherwise damage the ozone generator. A pump recirculates water from the tank, through an ozone injector and back in to the tank through the mixing eductor.

An oxygen generator provides mostly pure oxygen to the ozone generator. The ozone generator produces ozone and injects this ozone into the water circulation loop through a venturi injector. The resulting ozone rich water is mixed back into the tank through the eductor.

The primary limiting factors are available power and available treatment time. The pump, oxygen generator and ozone generator all require power. An efficient thirty gallons-per-minute pump (0.5 gallons-per-second) consumes approximately 1250 watts of power. It would take this pump almost four hours to pump 7000 gallons of water, approximately one tankers worth of water. Frequently, total transit times are much less, sometimes less than an hour. This limiting factor alone would require the water to remain in the treating tanker for additional three hours pre or post-transit, making it more efficient to simply treat the water at the bottling or storage plant.

The invention solves this problem by reducing the treatment time down to less than an hour, depending upon the level of biological activity in the water. The invention can treat approximately 10,800 gallons in a single hour, resulting in sterilized water having residual ozone counts in the 0.1 to 0.5 parts-per-million range, which is the currently acceptable range. The invention accomplishes this by a combination of an oversized alternator on the vehicle, additional storage batteries, an inverter, an efficient oxygen generator, an efficient and relatively low output ozone generator, a venturi type in-line injector and a mixing eductor within the tank. The combination of the low power consumption components and the mixing edutor are one an important part of the invention. In one embodiment, the mixing eductor has a five to one mixing ratio of treated water to tank water. This means that for every single gallon of water pumped by the ozone injector, five additional gallons are treated in the tank. Essentially, the use of the eductor multiples the treating efficiency by a factor of six.

The invention is capable of operating in two different distinct modes, a water purification mode in which the water is sterilized by ozone and a water oxygenation mode in which oxygen is introduced into the water to support livestock. The water oxygenation mode is accomplished by simply disabling the ozone generator and allowing the oxygen from the oxygen generator to pass through the disabled ozone generator and injected into the water circulation loop. Once the livestock has been unloaded, the tank can be sterilized by filling the tank with relatively clean water and treating it with ozone.

An alternative embodiment eliminates ozone generator 12 altogether and uses a larger oxygen generator 13. This embodiment forfeits the sterilization feature of the previous embodiment but allows more complete oxygenation of the water for livestock transport as more power is available for the oxygen generation function.

Additional advantages and novel features of the invention will be set forth in part in the description that follows, and in part will become apparent to those skilled in the art upon examination of the following or may be learned by practice of the invention. The advantages of the invention may be realized and attained by means of the instrumentalities and combinations particularly pointed out in the appended claims.

DETAILED DESCRIPTION OF THE INVENTION

Figure 1:
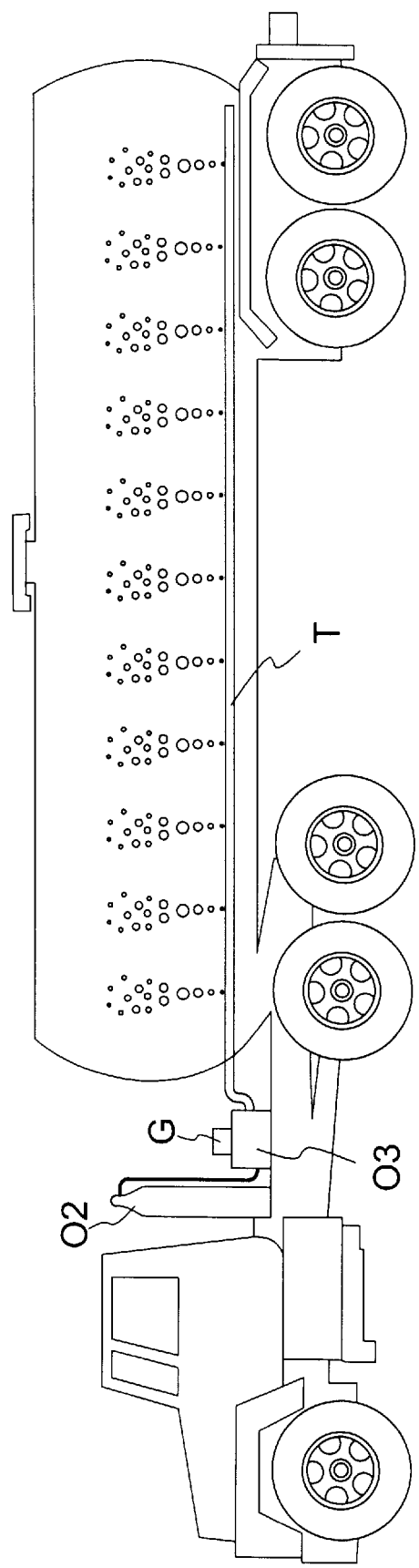
FIG. 1 is a schematic diagram of a failed prior art solution.
Figure 2:
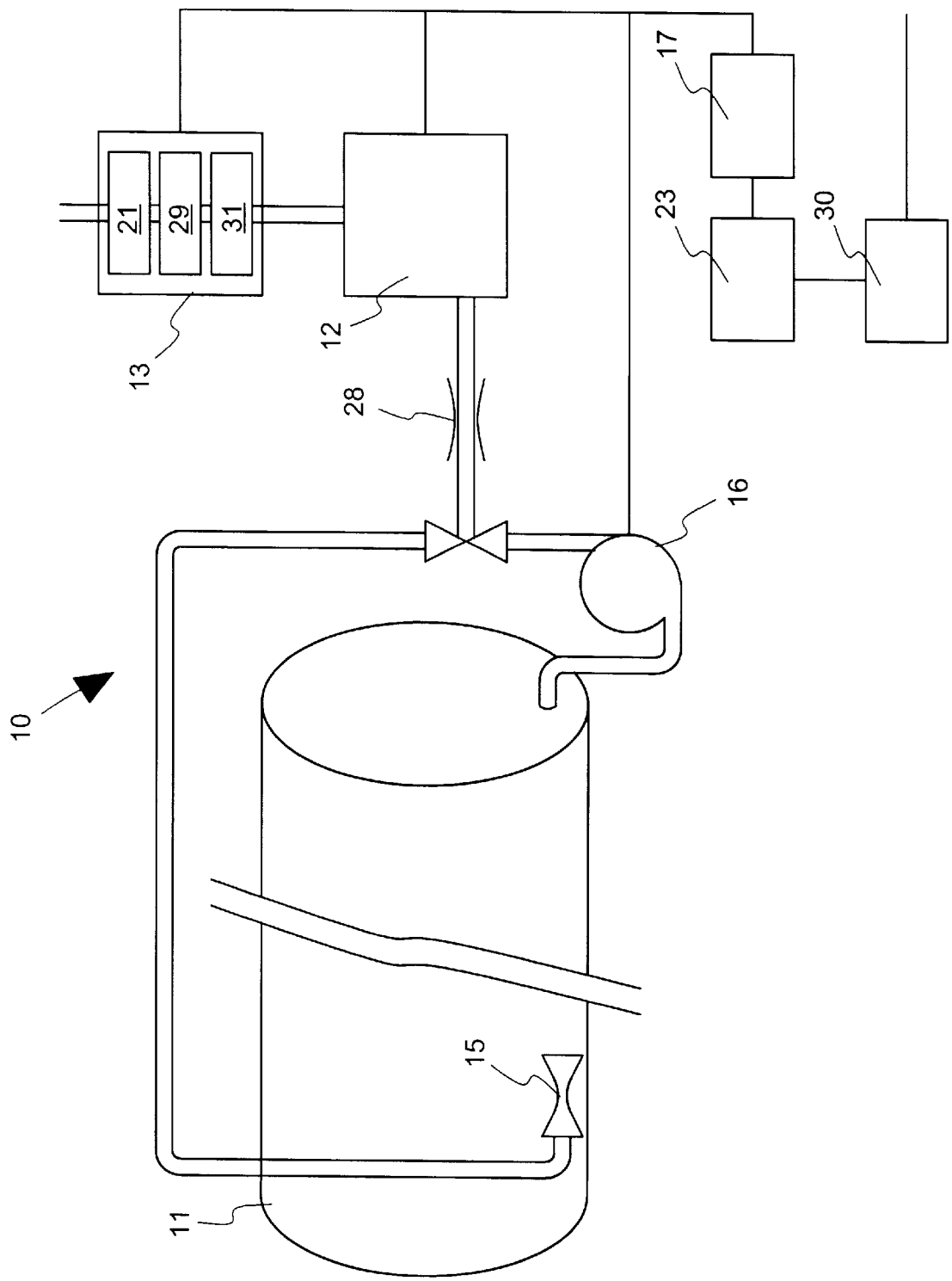
FIG. 2 is a block diagram schematic view of an in-transit water treatment system according to the invention.
Figure 3:
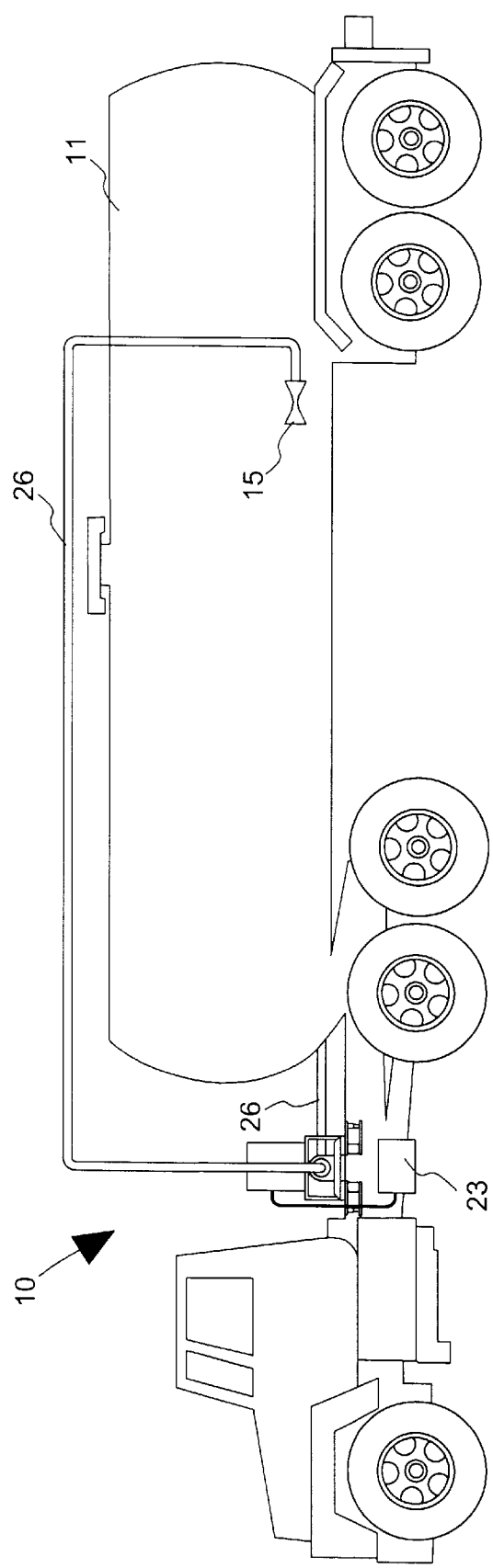
FIG. 3 is a schematic diagram of a tanker rig according to the invention.
Figure 4:
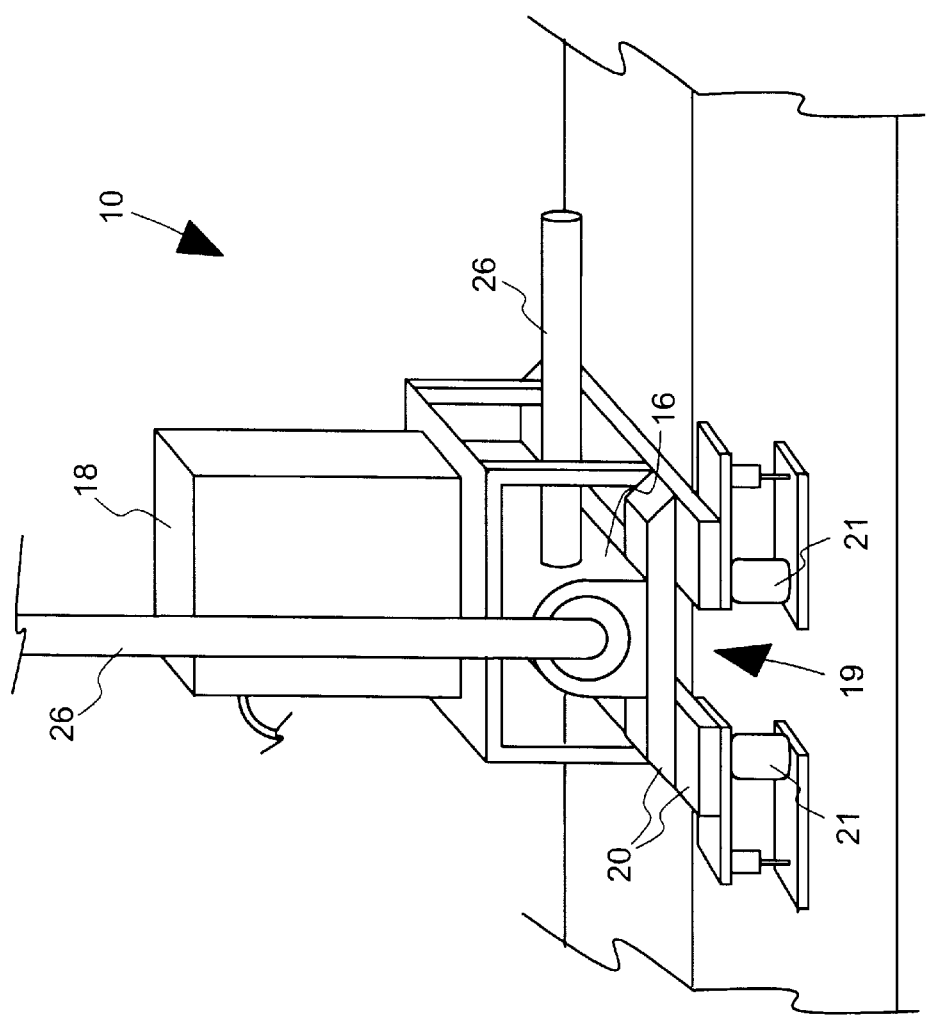
FIG. 4 is a drawing of the vibration isolation system used to protect the oxygen and ozone production system.

Referring to FIGS. 2 through 4 an in-transit water treatment system according to the invention is shown and is generally designated at 10. Water treatment system 10 includes a reservoir tank 11, such as a 6800–7000 gallon stainless steel tank found on tanker trucks or trailers, an ozone generator 12, and oxygen generator 13, and a re-circulation pump 16.

In general terms water treatment system 10 uses re-circulation pump 16 to remove water from tank 11, inject ozone or oxygen into the water through venturi injector 14 and mix the resulting water back into tank 11 through mixing eductor 15. In the case where ozone is desired to be injected into the water, oxygen generator 13 provides substantially pure oxygen to ozone generator 13 which then generates ozone which is injected into the water through injector 14. In the case were only oxygen is desired to be injected into the water, the oxygen from oxygen separator 13 is supplied directly to injector 14 either by bypassing ozone generator 12 or inactivating ozone generator 12 as the oxygen is passed through it.

Oxygen generator 13 provides mostly pure oxygen to the ozone generator 12, which is here a 03-21, manufactured by Mac Co. Oxygen generator 13 is here a combination of an oil-less compressor 21, storage tank 29 and air separator or oxygen 31. The product of ozone generator 13 is injected into water circulation loop 26 through injector 14, here a Mazzie venturi injector, model no. 1583. A restrictor or needle valve 28 is placed on the downstream end of ozone generator 12 to provide back-pressure to facilitate the production of ozone. Otherwise, the low pressure generated by injector 14 interferes with ozone production. The product of ozone generator 12 can be either ozone or oxygen as will be explained later, depending upon the application. The resulting product is mixed back into tank 11 through eductor 15, which is here manufactured by Fox Valve Development Corp. of Dover, N.J. This eductor has a five to one mixing ratio of tank water to treated water. Advantageously, eductor 15 is positioned to effect the maximum volume of liquid in tank 11. Here eductor 15 has an effective mixing radius of approximately twenty-five feet. Here tank 11 is approximately forty feet in length. By positioning eductor 15 approximately thirteen feet from the rear of tank 11 and drawing water into circulation loop 26 at the front of tank 11, more effective mixing can be accomplished.

Re-circulation loop 26 is here stainless steel braid reinforced Teflon® hose of one and one-half inch inside diameter. Re-circulation pump 16 is here a totally enclosed fan cooled pump which pumps thirty gallons per minute at thirty psi and is here manufactured by Train Inc. Ozone generator 12 here produces ten cubic feet or 0.5 lbs. per hour of ozone at twelve to fourteen psi. Ozone generator 12, oxygen generator 13 and re-circulation pump 16 are here powered by alternating current derived from inverter 17 which converts DC current from an oversized alternator 22, here a 160 amp-twelve volt alternator manufactured by Leece Neville. Inverter 17 is here a Freedom 25 inverter manufactured by Heart Interface which produces twenty amps of 115 volt AC current from a twelve volt DC source. An isolator 30 directs DC current between the main vehicle battery and supplemental storage batteries 23 as needed. Ozone generator 12 and oxygen generator 13 each consume four amps of current while re-circulation pump 16 consumes 10.5 amps.

Advantageously, ozone generator 12, oxygen generator 13 and circulation pump 16 are all mounted in close proximity to tank 11. Ozone generator 12 and oxygen generator 13 are mounted within a protective enclosure 18. Enclosure 18 and pump 16 are mounted on a vibration isolation system 19. Vibration isolation system 19 here includes a mounting frame 20 which is suspended above the trailer or vehicle frame 2 by air cushions 21. Air cushions 21 are here are part of an air suspension system manufactured by Link Manufacturing Ltd., under the trademark BUNKMATE, model no. FRTS60-A. This air suspension system has been incorporated into the embodiment illustrated.

In the case of potable water transport requiring purification, the water is treated with ozone from generator 12 during transit. In the case aquatic livestock transport, ozone generator 12 is disabled which allows oxygen from oxygen generator 13 to pass through ozone generator 12 directly into injector 14. Once the livestock has been unloaded, tank 11 is filled with water which is then treated with ozone to sterilize tank 11 to prevent cross-contamination with subsequent cargo.

While there is shown and described specific embodiments of the invention, it is to be distinctly understood that this invention is not limited thereto but may be variously embodied to practice within the scope of the following claims.

I claim:

1. A system for treating fluid in-transit on a vehicle which comprises:

an ozone generator attachable to the vehicle;

a re-circulation loop having an inlet attachable to a reservoir on the vehicle;

a pump attachable to the vehicle and in fluid communication with the recirculation loop for moving fluid there through;

an ozone injector attachable within the re-circulation loop and to the ozone generator for injecting ozone into a fluid within the re-circulation loop;

an eductor attachable to an outlet on the re-circulation loop and positionable within the reservoir on the vehicle; and the ozone generator, the re-circulation loop, the pump, the ozone injector and the eductor each being configured to operate in-transit and thereby treat fluid in-transit.

2. The system of claim 1 further comprising an oxygen generator attachable to the vehicle and in fluid communication with the ozone generator.

3. The system of claim 2 further comprising a vibration isolation system attachable to the vehicle for supporting and isolating the oxygen generator, the ozone generator and the pump.

4. The system of claim 1 further comprising a vibration isolation system attachable to the vehicle for supporting and isolating the ozone generator and the pump.

5. The system of claim 4 further comprising an inverter connectable to a DC power source on the vehicle, the ozone generator and the pump, for converting the DC power into AC power and supplying power to the ozone generator and the pump.

6. The system of claim 3 further comprising an inverter connectable to a DC power source on the vehicle and to the oxygen generator, the ozone generator and the pump, for converting the DC power into AC power and supplying power to the oxygen generator, the ozone generator and the pump.

7. The system of claim 2 further comprising an inverter connectable to a DC power source on the vehicle and to the oxygen generator, the ozone generator and the pump, for converting the DC power into AC power and supplying power to the oxygen generator, the ozone generator and the pump.

8. The system of claim 1 further comprising an inverter connectable to a DC power source on the vehicle and to the ozone generator and the pump, for converting the DC power into AC power and supplying power to the ozone generator and the pump.

9. The system of claim 8 further comprising a restrictor attachable between the ozone generator and the ozone injector to restrict the rate of injection of ozone into the re-circulation loop.

10. The system of claim 7 further comprising a restrictor attachable between the ozone generator and the ozone injector to restrict the rate of injection of ozone into the re-circulation loop.

11. The system of claim 6 further comprising a restrictor attachable between the ozone generator and the ozone injector to restrict the rate of injection of ozone into the re-circulation loop.

12. The system of claim 5 further comprising a restrictor attachable between the ozone generator and the ozone injector to restrict the rate of injection of ozone into the re-circulation loop.

13. The system of claim 4 further comprising a restrictor attachable between the ozone generator and the ozone injector to restrict the rate of injection of ozone into the re-circulation loop.

14. The system of claim 3 further comprising a restrictor attachable between the ozone generator and the ozone injector to restrict the rate of injection of ozone into the re-circulation loop.

15. The system of claim 2 further comprising a restrictor attachable between the ozone generator and the ozone injector to restrict the rate of injection of ozone into the re-circulation loop.

16. The system of claim 1 further comprising a restrictor attachable between the ozone generator and the ozone injector to restrict the rate of injection of ozone into the re-circulation loop.

17. A vehicle for treating fluid in transit having a DC power source and a tank for water storage which comprises:

an ozone generator attached to the vehicle;

a re-circulation loop having an inlet attached to the tank;

a pump attached to the vehicle and in fluid communication with the recirculation loop for moving fluid there through;

an ozone injector attached within the re-circulation loop and to the ozone generator for injecting ozone into a fluid within the re-circulation loop;

an eductor attached to an outlet on the re-circulation loop and positioned within the tank; and the ozone generator, the re-circulation loop, the pump, the ozone injector and the eductor each being configured to operate in-transit and thereby treat fluid in-transit.

18. The system of claim 17 further comprising an oxygen generator attached to the vehicle and in fluid communication with the ozone generator.

19. The system of claim 18 further comprising a vibration isolation system attached to the vehicle for supporting and isolating the oxygen generator, the ozone generator and the pump.

20. The system of claim 17 further comprising a vibration isolation system attached to the vehicle for supporting and isolating the ozone generator and the pump.

21. The system of claim 20 further comprising an inverter connected to the DC power source on the vehicle, the ozone generator and the pump, for converting the DC power into AC power and supplying power to the ozone generator and the pump.

22. The system of claim 19 further comprising an inverter connected to the DC power source on the vehicle and to the oxygen generator, the ozone generator and the pump, for converting the DC power into AC power and supplying power to the oxygen generator, the ozone generator and the pump.

23. The system of claim 18 further comprising an inverter connected to the DC power source on the vehicle and to the oxygen generator, the ozone generator and the pump, for converting the DC power into AC power and supplying power to the oxygen generator, the ozone generator and the pump.

24. The system of claim 17 further comprising an inverter connectable to the DC power source on the vehicle and to the ozone generator and the pump, for converting the DC power into AC power and supplying power to the ozone generator and the pump.

25. The system of claim 24 further comprising a restrictor attached between the ozone generator and the ozone injector to restrict the rate of injection of ozone into the re-circulation loop.

26. The system of claim 23 further comprising a restrictor attached between the ozone generator and the ozone injector to restrict the rate of injection of ozone into the re-circulation loop.

27. The system of claim 22 further comprising a restrictor attached between the ozone generator and the ozone injector to restrict the rate of injection of ozone into the re-circulation loop.

28. The system of claim 21 further comprising a restrictor attached between the ozone generator and the ozone injector to restrict the rate of injection of ozone into the re-circulation loop.

29. The system of claim 20 further comprising a restrictor attached between the ozone generator and the ozone injector to restrict the rate of injection of ozone into the re-circulation loop.

30. The system of claim 19 further comprising a restrictor attached between the ozone generator and the ozone injector to restrict the rate of injection of ozone into the re-circulation loop.

31. The system of claim 18 further comprising a restrictor attached between the ozone generator and the ozone injector to restrict the rate of injection of ozone into the re-circulation loop.

32. The system of claim 17 further comprising a restrictor attached between the ozone generator and the ozone injector to restrict the rate of injection of ozone into the re-circulation loop.

33. A system for treating fluid in-transit on a vehicle which comprises:

an oxygen generator attachable to the vehicle;

a re-circulation loop having an inlet attachable to a reservoir on the vehicle;

a pump attachable to the vehicle and in fluid communication with the recirculation loop for moving fluid there through;

an injector attachable within the re-circulation loop and to the oxygen generator for injecting oxygen into a fluid within the re-circulation loop;

an eductor attachable to an outlet on the re-circulation loop and positionable within the reservoir on the vehicle; and the oxygen generator, the re-circulation loop, the pump, the ozone injector and the eductor each being configured to operate in-transit and thereby treat fluid in-transit.

34. The system of claim 33 further comprising a vibration isolation system attachable to the vehicle for supporting and isolating the oxygen generator and the pump.

35. The system of claim 34 further comprising an inverter connectable to a DC power source on the vehicle and to the oxygen generator and the pump, for converting the DC power into AC power and supplying power to the oxygen generator and the pump.

36. The system of claim 33 further comprising an inverter connectable to a DC power source on the vehicle and to the oxygen generator and the pump, for converting the DC power into AC power and supplying power to the oxygen generator and the pump.

* * * * *

UNITED STATES PATENT AND TRADEMARK OFFICE
CERTIFICATE OF CORRECTION

PATENT NO.    : 6,200,473 B1                                    Page 1 of 1
DATED         : March 13, 2001
INVENTOR(S)   : G. Scott Fahey It is certified that error appears in the above-identified patent and that said Letters Patent is hereby corrected as shown below:

Title page,
Inventor address: [Stoney] should read -- Stony --

Column 1,
Line 45, ...and [he] should read -- and then --

Column 2,
Line 4, [contained] should read -- contain --
Line 44, ...for additional... should read -- for an additional --
Line 59, [edutor] should read -- eductor --
Line 59, ...are one an... should read -- is an --
Line 64, [multiples] should read -- multiplies --

Column 3,
Line 51, [13] should be -- 12 --
Line 54, [separator] should read -- generator --
Lines 61-62, air separator [or oxygen] 31 should read -- air separator 31. --
Line 62, [13] should be -- 12 --

Column 4,
Line 24, "160" should NOT be in bold typeface
Line 26, "25" should NOT be in bold typeface
Line 34, [circulation] should read -- re-circulation --
Line 37, pump 16 should read -- re-circulation pump 16 --
Line 40, ...are here are part... should read -- here are part --
Line 47, ...In the case aquatic... should read -- In the case of aquatic --

Signed and Sealed this

Eighteenth Day of December, 2001

*Attest:*

JAMES E. ROGAN
*Attesting Officer*      *Director of the United States Patent and Trademark Office*